US007832943B2

(12) United States Patent
Hashimoto

(10) Patent No.: US 7,832,943 B2
(45) Date of Patent: Nov. 16, 2010

(54) CAGE FOR ROLLER BEARING

(75) Inventor: Kenichi Hashimoto, Oume (JP)

(73) Assignee: JTEKT Corporation, Osaka-shi, Osaka (JP)

( * ) Notice: Subject to any disclaimer, the term of this patent is extended or adjusted under 35 U.S.C. 154(b) by 477 days.

(21) Appl. No.: 11/826,644

(22) Filed: Jul. 17, 2007

(65) Prior Publication Data
US 2008/0019630 A1    Jan. 24, 2008

(30) Foreign Application Priority Data
Jul. 18, 2006    (JP)    ............................ P2006-195472

(51) Int. Cl.
*F16C 33/54* (2006.01)
*F16C 19/26* (2006.01)
(52) U.S. Cl. ...................... 384/573; 384/548; 384/569; 384/580
(58) Field of Classification Search ................ 384/296, 384/420, 548, 569, 572–573, 580, 621
See application file for complete search history.

(56) References Cited

U.S. PATENT DOCUMENTS

| 3,881,790 | A | * | 5/1975 | Ryanen | ........................ | 384/576 |
| 4,222,620 | A | * | 9/1980 | Mirring | ........................ | 384/576 |
| 4,425,011 | A | * | 1/1984 | Cunningham et al. | ....... | 384/571 |
| 5,033,878 | A | * | 7/1991 | Tsuji et al. | ................... | 384/576 |
| 5,295,749 | A | * | 3/1994 | Takahashi et al. | ........... | 384/576 |
| 5,772,338 | A | * | 6/1998 | Hillmann et al. | ............. | 384/470 |
| 5,803,620 | A | * | 9/1998 | Yokota | ........................ | 384/580 |
| 6,196,728 | B1 | * | 3/2001 | Wahler et al. | ................ | 384/580 |
| 6,461,049 | B2 | * | 10/2002 | Straub et al. | ................. | 384/572 |
| 6,767,135 | B2 | * | 7/2004 | Yokota | ........................ | 384/580 |
| 2004/0156571 | A1 | * | 8/2004 | Kotani | ......................... | 384/580 |
| 2005/0094913 | A1 | * | 5/2005 | Kackowski | ................. | 384/580 |

FOREIGN PATENT DOCUMENTS

| JP | 50-22148 | 3/1975 |
| JP | 62-170827 | 10/1987 |

(Continued)

OTHER PUBLICATIONS

European Search Report dated Jun. 4, 2009.

(Continued)

*Primary Examiner*—Marcus Charles
(74) *Attorney, Agent, or Firm*—McGinn IP Law Group, PLLC

(57) ABSTRACT

A roller bearing cage includes annular portions provided respectively at opposite ends thereof, a plurality of pillar portions interconnecting the annular portions, a plurality of pockets for respectively holding needle rollers, and roller retaining portions formed respectively on circumferentially-opposed wall surfaces and of each pocket portion. A concave groove smaller in width than the pillar portion is formed axially in a back surface of each pillar portion and those portion of back surfaces of the annular portions disposed respectively at opposite ends of each pillar portion. Separation groove portions are formed respectively at opposite sides of those portions of the concave groove disposed respectively at the opposite ends of the pillar portion, and extend respectively to corresponding circumferentially-opposite side surfaces of the pillar portion, and each separation groove portion separates the corresponding roller retaining portion and annular portion from each other.

4 Claims, 2 Drawing Sheets

| | FOREIGN PATENT DOCUMENTS | | |
|---|---|---|---|
| JP | 2002242938 A * | 8/2002 | |
| JP | 2003-42163 | 2/2003 | |
| JP | 2004-84705 | 3/2004 | |
| JP | 2005-163994 | 6/2005 | |
| JP | 2006-132622 | 5/2006 | |

OTHER PUBLICATIONS

Notification of Reason(s) for Refusal dated Jun. 15, 2010, with English translation.

* cited by examiner

US 7,832,943 B2

CAGE FOR ROLLER BEARING

FIELD OF THE INVENTION

Background of the Invention

This invention relates to a roller bearing cage for locating and rollably holding a plurality of rollers at an inner periphery of an outer ring.

A conventional cage for a roller bearing includes a pair of annular portions provided respectively at opposite ends thereof, a plurality of pillar portions interconnecting these annular portions, and a plurality of pockets formed between the pillar portions so as to respectively hold rollers. Roller retaining portions are formed on radially-inward portions of wall surfaces of the pockets, and deformation-allowing portions each in the form of a concave groove are formed respectively in back surfaces of the pillar portions, and extend in an axial direction of the cage. When the roller retaining portions are pressed by the rollers, each deformation-allowing portion allows the corresponding pillar portion to be elastically deformed in this pressing direction, and when this pressing is canceled, the deformation-allowing portion allows the thus deformed pillar portion to be elastically restored into an initial condition. Thanks to the provision of the deformation-allowing portions, the cage having the rollers set therein can be easily inserted into an outer ring (see, for example, JP-A-2005-163994).

In the above conventional roller bearing cage, however, the deformation-allowing portion in the form of the concave groove extending in the axial direction is formed in a circumferentially-middle portion of the radially-inward peripheral surface (back surface) of the pillar portion, and the roller retaining portions are continuous with the annular portions via opposite side portions of the back surfaces of the respective pillar portions. Therefore, when the rollers are pushed radially into the respective pockets, the roller retaining portions can not be easily deformed, and therefore a roller-pushing load becomes large. As a result, the cage having the rollers set therein can not be easily inserted into the outer ring, and this phenomenon is conspicuous particularly when the number of the roller is large and when the sectional thickness of the cage is large.

SUMMARY OF THE INVENTION

Therefore, it is an object of this invention to provide a cage for a roller bearing, in which pillar portions can be smoothly deformed when rollers are pushed into respective pockets, and the cage having the rollers set therein can be easily inserted into an outer ring.

According to the present invention, a cage for a roller bearing includes:

a pair of annular portions disposed coaxially each other;

a plurality of pillar portions interconnecting the pair of annular portions;

a plurality of pockets defined by the pair of annular portions and the plurality of pillar portions for holding rollers, respectively;

roller retaining portions formed respectively on circumferentially-opposed wall surfaces of each of the pocket portions; and a concave groove extending axially in a back surface of the pillar portion and back surfaces of the annular portions, a width of the concave groove being smaller than a width of the pillar portion defined between the circumferentially-opposite side surfaces, wherein the concave groove includes separation groove portions formed respectively at circumferentially opposite sides of the concave groove at the opposite ends of the pillar portion, the separation groove portions extending respectively to the corresponding circumferentially-opposed wall surfaces of the pillar portion for separating the corresponding roller retaining portion and the corresponding annular portion from each other.

According to the present invention, the concave groove preferably includes width-increasing groove portions that are formed respectively at the circumferentially opposite sides of the concave groove at the annular portions and extend respectively circumferentially beyond the corresponding circumferentially-opposed wall surfaces of the pillar portion.

As described above, the concave groove is formed in the back surface of each pillar portion and back surfaces of the annular portions disposed respectively at the circumferentially opposite ends of each pillar portion, and the width of the concave groove is smaller than the width of the pillar portion, and the separation groove portions each separating the roller retaining portion and the annular portion from each other are formed respectively at the opposite sides of those portions of the concave groove disposed respectively at the opposite ends of the pillar portion, and extend respectively to the corresponding circumferentially-opposite side surfaces of the pillar portion. Therefore, the thickness of that portion of the pillar portion lying between each roller retaining portion and the corresponding annular portion is reduced, and the roller retaining portion and the annular portion are separated from each other by the separation groove portion. Therefore, the annular portions less prevent the deformation of the roller retaining portions, and the roller retaining portions can be more easily deformed, and therefore there is achieved an advantage that the ability of incorporating the cage and the rollers into an outer ring can be enhanced.

And besides, the separation groove portions are formed respectively at the opposite sides of those portions of the concave groove disposed respectively at the opposite ends of the pillar portion, and extend respectively to the circumferentially-opposite side surfaces of the pillar portion, and the separation groove portions are disposed respectively at corner portions of the pockets, and therefore a lubricating effect achieved by supply of grease or lubricant to the pockets receiving the respective rollers is enhanced.

Furthermore, the width-increasing groove portions are formed respectively at the opposite sides of those portions of the concave groove disposed respectively at the annular portions, and extend respectively beyond the circumferentially-opposite side surfaces of the pillar portion. Therefore, those portions of the annular portions having the width-increasing groove portions are reduced in thickness, and therefore the annular portions are reduced in rigidity, and therefore the annular portions having the width-increasing groove portions less affect the deformation of the roller retaining portions, so that the roller retaining portions can be more easily deformed.

DETAILED DESCRIPTION OF PREFERRED EMBODIMENTS

First Embodiment

Figure 1:
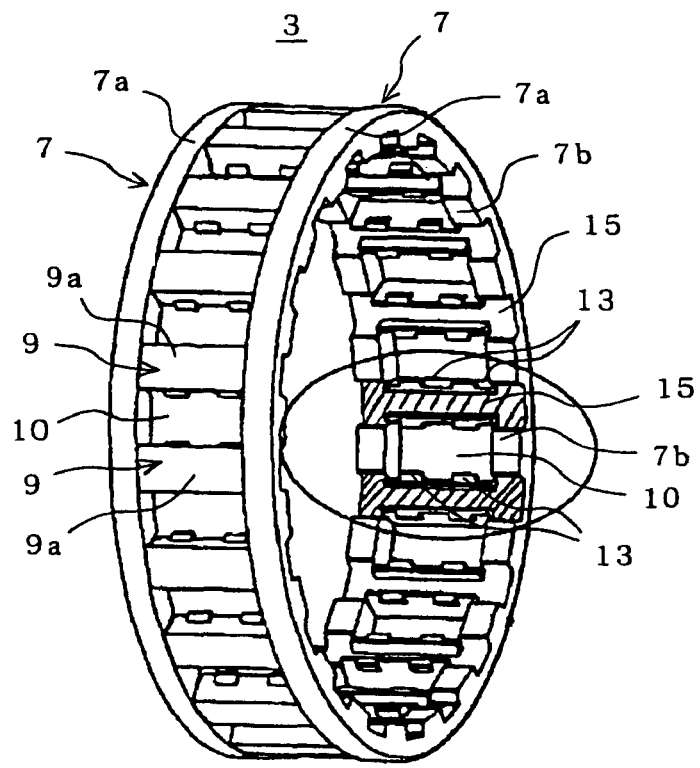
FIG. 1 is a perspective view of a first embodiment of a roller bearing cage of the present invention.
Figure 2:
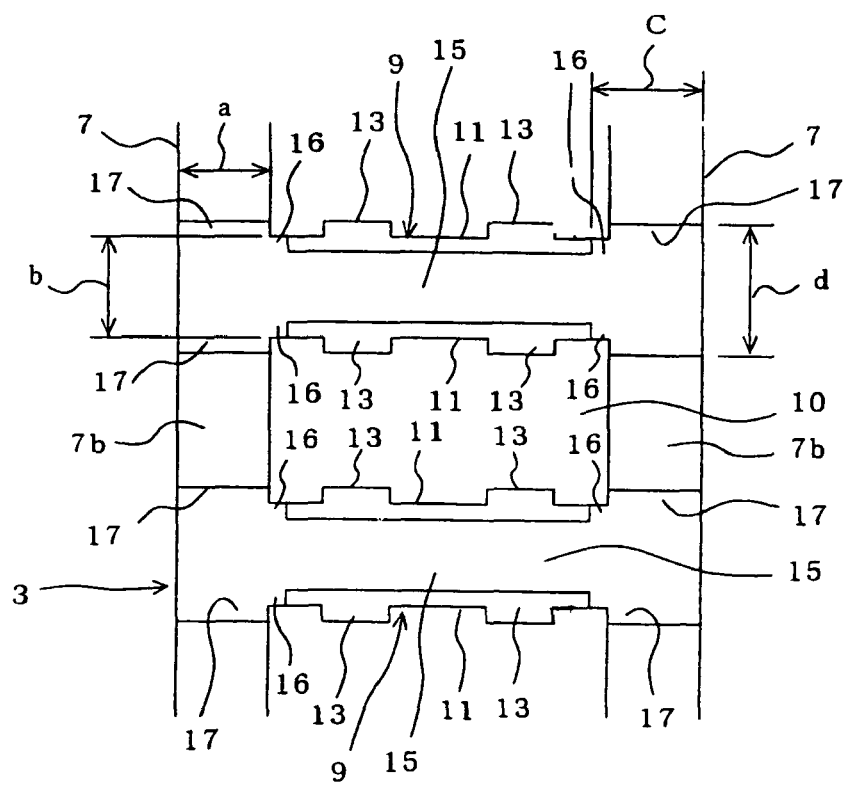
FIG. 2 is a plan view of an important portion of the roller bearing cage as seen from a back surface-side thereof.
Figure 3:
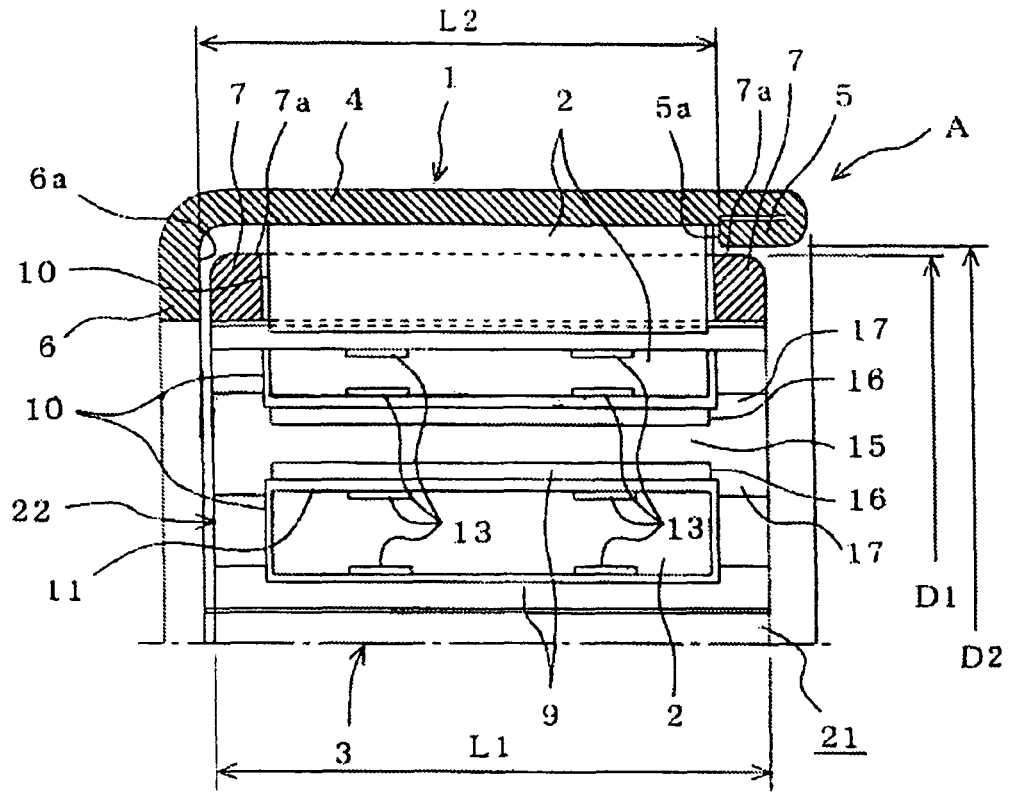
FIG. 3 is an enlarged partially cross-sectional view of a roller bearing provided with the roller bearing cage.

FIG. 1 is a perspective view of a first embodiment of a roller bearing cage of the present invention, FIG. 2 is a plan view of an important portion of the roller bearing cage as seen from a back surface-side thereof, and FIG. 3 is an enlarged partially cross-sectional view of a roller bearing provided with the roller bearing cage.

In these Figures, reference numeral 1 denotes a drawn cup outer ring, reference numeral 2 denote a needle roller, and reference numeral 3 denotes the roller bearing cage. The needle roller bearing A is formed by the outer ring 1, the needle rollers 2 and the cage 3.

The outer ring 1 includes a tubular raceway portion 4, and a pair of ribs 5 and 6 formed respectively at axially opposite ends of the raceway portion 4, and this outer ring 1 is formed into a one-piece construction. One rib 5 is smaller in thickness than the raceway portion 4, and is bent to be disposed contiguous to an inner peripheral surface of the raceway portion 4 over an entire periphery thereof. The other rib 6 is bent to project radially inwardly from the raceway portion 4.

The cage 3 includes a pair of annular portions 7 and 7 disposed respectively at axially opposite ends thereof, and pillar portions 9 extending between the two annular portions 7 and 7 and arranged at equal intervals in a circumferential direction. The cage 3 has a plurality of pockets 10 for respectively holding the needle rollers 2, each pocket 10 being formed between the adjacent pillar portions 9 and 9.

Next, the construction of the cage 3 will be described in further detail.

The cage 3 is made of a synthetic resin, and an outer diameter D1 of the cage 3 is smaller than an inner diameter D2 of the one rib 5 of the outer ring 1. An axial length L1 of the cage 3 is larger than an axial length L2 between axially inner end surfaces 5a and 6a of the ribs 5 and 6.

Outer peripheral surfaces 9a of the pillar portions 9 are disposed radially inwardly of outer peripheral surfaces 7a of the annular portions 7.

Each pocket 10 has a pair of wall surfaces 11 and 11 opposed to each other in the circumferential direction and disposed along directions radiating from the center of the cage 3 or along the radial direction. Two roller retaining portions 13 are formed on a radially-inward portion of each of the two wall surfaces 11 and 11 of each pocket 10, and project into a space defining the pocket 10. The roller retaining portions 13 formed on the two wall surfaces 11 and 11 have the same shape.

Each of these roller retaining portions 13 has such a shape that it is elastically deformed radially inwardly when pressed by the needle roller 2 mounted in the pocket 10, and is also elastically restored into its original condition when this pressing is canceled.

A concave groove (or hollow portion) 15 serving as a deformation-allowing portion is formed axially in a circumferentially-middle portion of a radially-inward peripheral surface (back surface) of each pillar portion 9, and extends to the outer ends of the two annular portions 7 in the axial direction (see hatched portions of FIG. 1 and FIG. 2), and a width of the concave groove 15 is smaller than a width of the pillar portion 9 between the circumferentially-opposite side surfaces thereof respectively defining the wall surfaces 11 of the adjacent pockets 10.

As shown in FIG. 2, separation groove portions 16 are formed respectively at opposite sides of the concave groove 15 disposed respectively at opposite ends of the pillar portion 9, and extend respectively to the corresponding circumferentially-opposite side surfaces of the pillar portion 9, and each separation groove portion 16 separates the corresponding roller retaining portion 13 and annular portion 7 from each other. Also, width-increasing groove portions 17 are formed respectively at opposite sides of the concave groove 15 disposed respectively at the annular portions 7, and extend respectively beyond the corresponding circumferentially-opposite side surfaces of the pillar portion 9.

The separation groove portions 16 and the width-increasing groove portions 17 communicate with the concave groove 15, and are equal in depth to the concave groove 15.

In FIG. 2, a indicates a width of the annular portion 7, b indicates the width of the pillar portion 9, c indicates combined widths of the separation groove portion 16 and width-increasing groove portion 17 in the axial direction, and d indicates combined widths of the concave groove 15 and two width-increasing groove portions 17 (in the circumferential direction) at the annular portion 7. Requirements for providing the separation groove portions 16 each separating the corresponding roller retaining portion 13 and annular portion 7 from each other are as follows.

$$c > a, d > b$$

Next, a method of assembling the needle roller bearing A provided with the cage 3 of the above construction will be described.

The ribs 5 and 6 provided respectively at the opposite ends of the outer ring 1 are beforehand formed, and may be subjected to a necessary heat treatment before the cage 3 is mounted in the outer ring 1. An assembly 22 comprising the cage 3 and the needle rollers 2 is incorporated into this outer ring 1.

This assembly 22 is composed of the cage 3 and the needle rollers 2 mounted respectively in the pockets 10 of the cage 3. When the needle rollers 2 are mounted in the respective pockets 10, each needle roller 2 is supported by the four roller retaining portions 13 formed on the two opposed wall surfaces 11 and 11 of the corresponding pocket 10.

In this condition, when the assembly 22 is pushed into the inner periphery of the outer ring 1, the needle rollers 2 are pressed by an inner peripheral surface of the rib 5, and are gradually sunk, and also the roller retaining portions 13 are gradually pressed radially inwardly to be elastically deformed, so that the needle rollers 2 are held in the respective pockets 10 in such a manner as not to pass through the respective pockets 10 to the inner periphery of the cage 3. At the time when the needle rollers 2 are sunk as described above, not the whole of each pillar portion 9 but the roller retaining portions 13 and their neighboring portions are mainly elastically deformed because of the provision of the concave groove 15 (formed in the pillar portion 9 and the annular portions 7), the separation groove portions 16 (formed in the pillar portion 9) and the width-increasing groove portions 17 (formed in the annular portions 7).

The reason for this will be described. The concave groove 15 formed in each pillar portion 9 and the annular portions 7 makes it possible for the roller retaining portions 13 to be easily deformed. However, the concave groove 15 is disposed in the circumferentially-middle portion of the back surface of the pillar portion 9, and therefore the roller retaining portions 13 are continuous with the annular portions 7 via the opposite side portions of the back surface of the pillar portion 9. Therefore, in the case where only the concave groove 15 is formed in each pillar portion 9 and the annular portions 7 as in the conventional structure, the annular portions 7 of a high rigidity prevent the deformation of the roller retaining portions 13, so that the roller retaining portions 13 can not be easily deformed.

Therefore, the concave groove 15 is formed in each pillar portion 9 and the annular portions 7, and in addition the separation groove portions 16 are formed respectively at the opposite sides of those portions of the concave groove 15 disposed respectively at the opposite ends of the pillar portion 9, and extend respectively to the circumferentially-opposite side surfaces of the pillar portion 9, each separation groove portion 16 separating the corresponding roller retaining portion 13 and annular portion 7 from each other. Therefore, the thickness of that portion of the pillar portion 9 lying between each roller retaining portion 13 and the corresponding annular portion 7 is reduced, and the roller retaining portion 13 and the annular portion 7 are separated from each other by the separation groove portion 16. Therefore, the annular portions 7 less prevent the deformation of the roller retaining portions 13, so that the roller retaining portions 13 can be more easily deformed.

Thus, the roller retaining portions 13 of the cage 3 can be easily deformed, and therefore the ability of incorporating the cage 3 and the needle rollers 2 into the outer ring 1 can be enhanced.

And besides, the separation groove portions 16 are formed respectively at the opposite sides of the concave groove 15 disposed respectively at the opposite ends of the pillar portion 9, and extend respectively to the circumferentially-opposite side surfaces of the pillar portion 9, and the separation groove portions 16 communicate with the concave groove 15, and are disposed respectively at corner portions of the pockets 10. Therefore, a lubricating effect achieved by supply of grease or lubricant to the pockets 10 receiving the respective needle rollers 2 is enhanced.

Furthermore, the concave groove 15 has not only the separation groove portions 16 but also the width-increasing groove portions 17 which are formed respectively at the opposite sides of those portions thereof disposed respectively at the annular portions 7, and extend respectively beyond the circumferentially-opposite side surfaces of the pillar portion 9. Therefore, those portions of the annular portions 7 having the width-increasing groove portions 17 are reduced in thickness, and therefore the annular portions 7 are reduced in rigidity, and therefore the annular portions 7 having the width-increasing groove portions 17 less affect the deformation of the roller retaining portions 13, so that the roller retaining portions 13 can be more easily deformed.

When the assembly 22 is completely inserted into the outer ring 1, the roller retaining portions 13 are restored into their original condition because of their own elasticity, and as a result the needle rollers 2 are urged to be moved radially outwardly into contact with the inner peripheral surface (that is, a raceway surface) of the outer ring 1, and a diameter of a circle in which the outer peripheral surfaces of the needle rollers 2 lie is larger than the inner diameter D2 of the rib 5.

Therefore, the assembly 22 is prevented from being withdrawn axially outwardly from the outer ring 1. In this manner, the needle roller bearing A is assembled.

Second Embodiment

Figure 4:
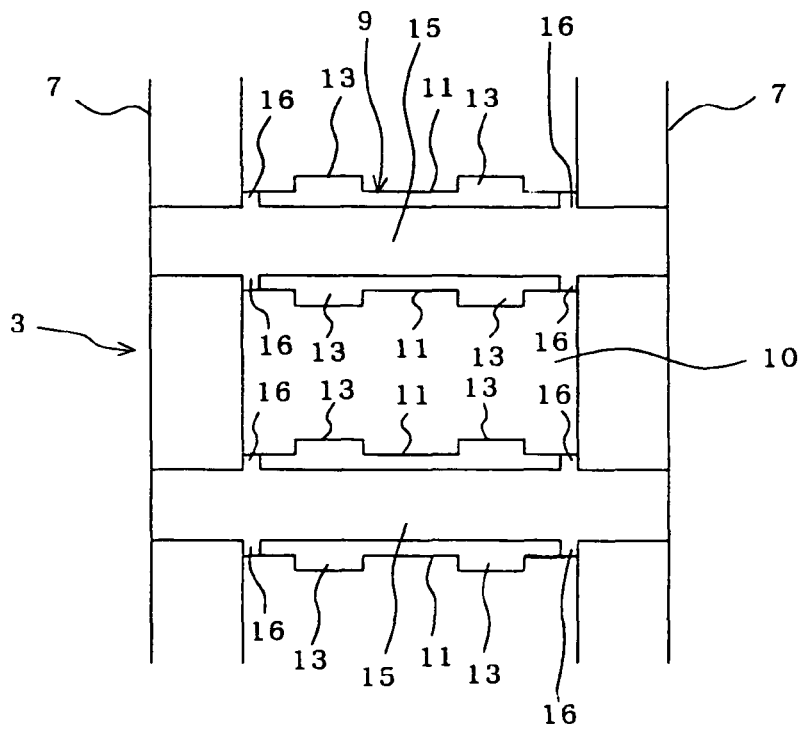
FIG. 4 is a plan view of an important portion of a second embodiment of a roller bearing cage of the invention as seen from a back surface-side thereof.

FIG. 4 is a plan view of an important portion of a second embodiment of a roller bearing cage of the invention as seen from a back surface-side thereof.

In the second embodiment of the invention shown in FIG. 2, those portions similar in construction to the corresponding portions of the first embodiment will be designated by identical reference numerals, respectively, and explanation thereof will be omitted.

In the first embodiment, the separation groove portions 16 and the width-increasing groove portions 17 are formed at the concave groove 15. In this second embodiment, however, only separation groove portions 16 are formed at each concave groove 15

Namely, the concave groove 15 is formed in each pillar portion 9 and annular portions 7, and in addition the separation groove portions 16 are formed respectively at opposite sides of those portions of the concave groove 15 disposed respectively at opposite ends of the pillar portion 9, and extend respectively to the corresponding circumferentially-opposite side surfaces of the pillar portion 9, each separation groove portion 16 separating corresponding roller retaining portion 13 and annular portion 7 from each other. Therefore, the thickness of that portion of the pillar portion 9 lying between each roller retaining portion 13 and the corresponding annular portion 7 is reduced, and the roller retaining portion 13 and the annular portion 7 are separated from each other by the separation groove portion 16. Therefore, the annular portions 7 less prevent the deformation of the roller retaining portions 13, so that the roller retaining portions 13 can be more easily deformed.

With this construction in which only the separation groove portions 16 are formed at the concave groove 15, the deformation of the roller retaining portions 13 can be easily effected satisfactorily.

In the above first and second embodiments, although the cage 3 is made of a synthetic resin, but may be made of metal.

The depth of the concave groove 15 can be suitably determined through experiments and others according to whether the cage 3 is made of the synthetic resin or the metal.

What is claimed is:
1. A cage for a roller bearing comprising:
   a pair of annular portions disposed coaxially each other;
   a plurality of pillar portions interconnecting the pair of annular portions;
   a plurality of pockets defined by the pair of annular portions and the plurality of pillar portions for holding rollers, respectively;
   roller retaining portions formed respectively on circumferentially-opposed wall surfaces of each of the pocket portions; and
   a concave groove extending axially in a back surface of the pillar portion and back surfaces of the annular portions, a width of the concave groove being smaller than a width of the pillar portion defined between the circumferentially-opposite side surfaces,
   wherein the concave groove includes separation groove portions formed respectively at circumferentially opposite sides of the concave groove at the opposite ends of the pillar portion, the separation groove portions extending respectively to the corresponding circumferentially-opposed wall surfaces of the pillar portion for separating the corresponding roller retaining portion and the corresponding annular portion from each other.

2. The cage according to claim 1, wherein the concave groove includes width-increasing groove portions that are formed respectively at the circumferentially opposite sides of the concave groove at the annular portions and extend respectively circumferentially beyond the corresponding circumferentially-opposed wall surfaces of the pillar portion.

3. A roller bearing comprising:
a drawn cup outer ring;
rollers; and
a cage according to claim 1.

4. The roller bearing according to claim 3, wherein the outer ring includes a tubular raceway portion and a pair of ribs formed respectively at axially opposite ends of the raceway portion, one of the ribs is smaller in thickness than the raceway portion and is bent to be disposed contiguous to the raceway portion, and the other rib is bent to project radially inwardly from the raceway portion.

\* \* \* \* \*